March 29, 1949.    L. E. BORDER    2,465,628
INSTRUMENTATION ASSEMBLY
Filed May 10, 1944
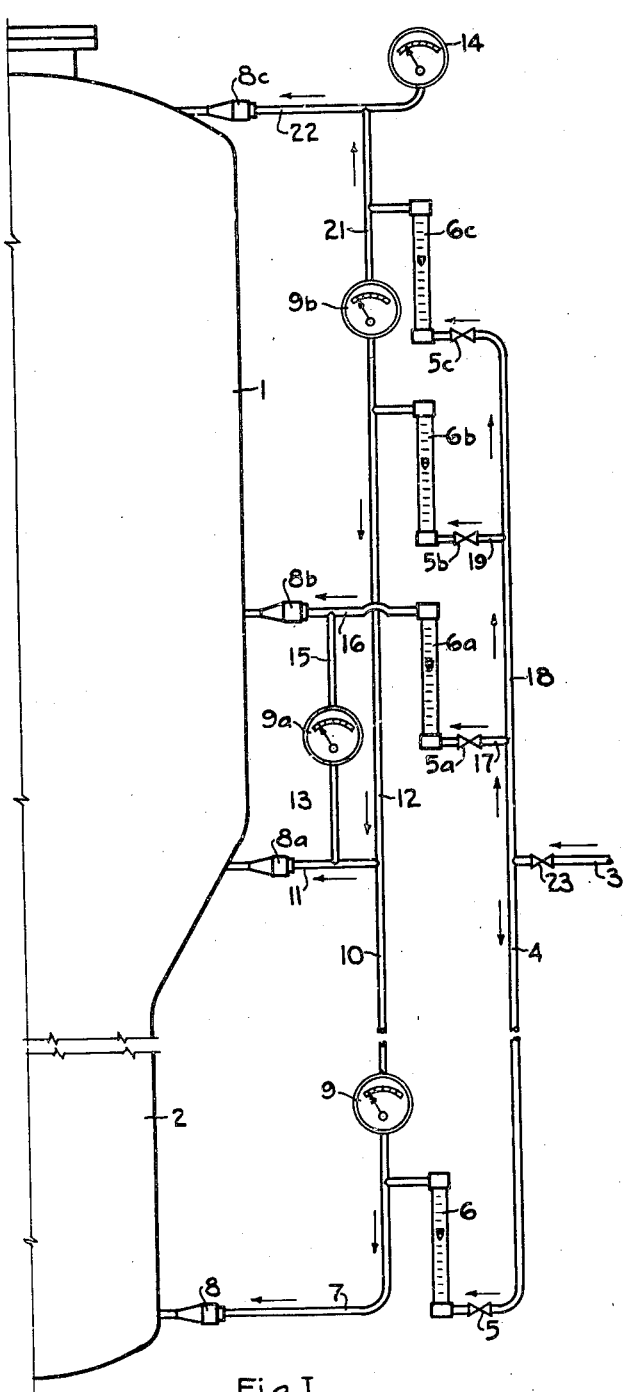
Fig. I
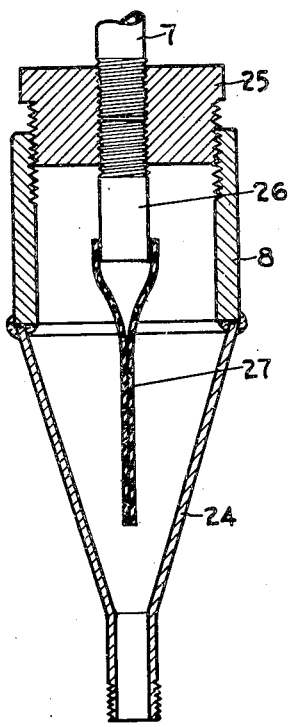
Fig. II
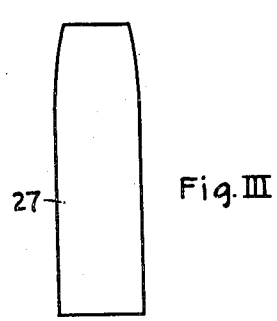
Fig. III
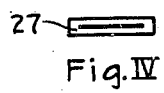
Fig. IV
Inventor: Lawson E. Border
By his Attorney:

Patented Mar. 29, 1949

2,465,628

UNITED STATES PATENT OFFICE 2,465,628

INSTRUMENTATION ASSEMBLY

Lawson E. Border, Alton, Ill., assignor to Shell Development Company, San Francisco, Calif., a corporation of Delaware Application May 10, 1944, Serial No. 534,955

5 Claims. (Cl. 73—432)

The present invention relates to instrumentation assemblies, and more particularly to instrumentation assemblies suitable for use in connection with various processes wherein pulverulent materials are handled.

Various types of catalytic processes have recently come into common use wherein finely divided catalyst particles, usually of the order of 200 microns or less in diameter, are passed in continuous concurrent or countercurrent contact with fluid material which is to be reacted. In one general type of such process the catalyst is carried through the system by means of a vapor or gas stream, usually passing through a reaction zone followed by a separation zone wherein the catalyst particles are separated from the reaction products, the catalyst particles then being passed to a regeneration zone and finally returned to the reaction zone after having been regenerated. In order to successfully and economically operate such processes it is necessary to maintain an optimum flow of the various materials through the system, thus necessitating the use of instruments to determine the pressure, catalyst density, flow rates, pressure differentials, etc., in the various parts of the reaction, regeneration and conduit systems.

The instrumentation of such processes presents certain difficulties, many of which are due to the fact the pulverulent catalyst particles tend to enter and pack in orifices and conduits which are in flow communication with both the interior of the processing equipment and the instruments. Since many of the instruments which are most useful for indicating the operating conditions within a vessel or conduit, as for example pressure gauges, differential pressure manometers, certain types of flow meters, particularly those embodying Pitot tubes, and the like, require direct flow communication with the interior of the system which is to be instrumented, it is apparent that the problem of preventing entry of pulverulent material into the instrument lines is a serious one.

Numerous attempts have been made to overcome these difficulties by the installation of various types of filters, traps, check valves and the like, but the proposed systems have generally proved unsatisfactory due to clogging of the filters or traps, excessively high pressure drop and flow resistance in the check valves leading to inaccurate determinations by the instruments, difficulties in maintenance, failure to operate during pressure surges within the system and for various other reasons.

It is an object of the present invention to provide an instrumentation assembly which will overcome the difficulties outlined above. A further object is to provide an instrumentation assembly which is adaptable for use with any type of instrument requiring direct flow communication with the interior of the equipment in connection with which it is utilized. Another object is to provide an instrumentation assembly obviating the necessity for filters and which will operate to prevent passage of material from within a system into the instrumentation conduits, both during normal operation and in the event of sudden pressure surges within the system.

Other objects, as well as some of the advantages to be derived in utilizing the present invention will become apparent from the following detailed description thereof, taken together with accompanying drawings forming a part of this specification and wherein:

Fig. I is a schematic diagram illustrating the general arrangement of an instrumentation assembly according to the invention.

Fig. II is a sectional elevation of a check valve assembly according to the invention.

Fig. III is an elevation of the check valve taken at a right angle to the view in Fig. II.

Fig. IV is an elevation of the discharge end of the check valve.

The problem of instrumenting systems containing pulverulent materials is particularly difficult in certain petroleum and allied refining processes wherein the so-called "fluid catalysts" are employed for carrying out chemical conversions and reactions, as for example in the cracking, reforming, hydrogenation, dehydrogenation, cyclization, aromatization, alkylation, isoforming, polymerization, desulfurization, etc., of petroleum products, coal-tar products and the like. For purposes of illustration, the invention will be described with particular reference to its application to the instrumentation of a reaction vessel wherein gas oil is cracked to form aviation gasoline and butylenes, the reaction being carried out under pressure in the presence of a fluidized catalyst comprising silica and alumina, 90% by weight of the catalyst particles being less than approximately 150 microns in diameter.

In Fig. I, the unit to be instrumented comprises a reactor vessel 1 including a stand-pipe 2 in direct flow communication with vessel 1. A conduit 3 including a valve 23 leads from a source of gas under pressure (not shown), preferably a gas which is inert with respect to the materials in the reaction system, and terminates in flow communication with conduits 4 and 18. Conduit 4 leads through valve 5, rotameter 6, conduit 7 and check valve 8 to stand-pipe 2. Conduit 7 is also in direct flow communication with a differential pressure manometer 9. The opposite leg of manometer 9 is in flow communication with the lower portion of reaction vessel 1 through conduits 10 and 11 and check valve 8a. Conduit 11 is also in direct flow communication with conduit 3 through conduits 18 and 19, valve 5b, rotameter 6b and conduit 12.

Conduit 11 also provides direct flow communication with one leg of differential pressure manometer 9a through conduit 13, the other leg of manometer 9a being in flow communication with the center portion of reaction vessel 1 through conduits 15 and 16 and check valve 8b. Conduit 16 is supplied with inert gas through rotameter 6a, conduit 17 including valve 5a, and conduit 18.

Differential pressure manometer 9b is in flow communication at one leg with the lower portion of reaction vessel 1 through check valve 8a, and conduits 11 and 12, the other leg being in flow communication with the top portion of reactor vessel 1 through conduits 21 and 22 and check valve 8c. Inert gas is supplied to conduit 21 through rotameter 6c, valve 5c and conduit 18.

Conduit 22 is also in direct flow communication with a pressure gauge 14.

Check valves 8, 8a, 8b and 8c are all constructed as shown in Figures II, III and IV. A housing is provided with a conical discharge outlet 24 and a reducer at 25 adapted to receive inlet conduit 7. Nipple 26 is also mounted in reducer 25 and is in flow communication with conduit 7. A flattened rubber tube 27 is affixed to the end of nipple 26 within the housing and in flow communication with nipple 26. The flattened rubber tube 27 is commonly known in the art as a rubber lip valve.

In operating a reactor, such as in Fig. I, there is an appreciable pressure differential between the top of the reactor vessel 1 and the bottom of stand-pipe 2. By determining the pressure differentials between various points in the system, the operating conditions between these points may be determined or interpolated. Thus, for example, if the pressure differential between the bottom of stand-pipe 2 and the lower portion of reactor vessel 1 is known, the catalyst density in the stand-pipe may be determined. Also, by determining the pressure differential between the top and lower portion of the reactor vessel 1, the catalyst level in the reactor may be determined. Similarly, the density of the catalyst in the reactor vessel 1 below the catalyst level may be determined if the pressure differential between the lower portion of reactor vessel 1 and a point near the catalyst level is known.

In the arrangement of Fig. I, the catalyst density in stand-pipe 2 is determined by the pressure differential between the bottom of stand-pipe 2 and the lower portion of reactor vessel 1, one leg of differential pressure manometer 9, or any other suitable differential pressure indicator or recorder, being in flow communication with the bottom of stand-pipe 2 through conduit 7 and check valve 8, the other leg being in flow communication with the lower portion of reactor vessel 1 through conduits 10 and 11 and check valve 8a. In order to prevent flow or seepage of catalyst into conduits 11 and 7, from whence it would seep into and clog or damage manometer 9, inert gas is supplied to conduit 7 via conduits 3 and 4 at a pressure in excess of the pressure existing in stand-pipe 2 at the point whereat conduit 7 enters. The rate of flow of inert gas through conduit 7 and into stand-pipe 2 is adjusted by means of valve 5 to a degree whereat only a slight positive flow into stand-pipe 2 is maintained. This adjustment may be easily made by observing rotameter 6 and opening valve 5 until a positive flow through rotameter 6 and into conduit 7 is attained. In practice it has been found that a flow rate of approximately 2 cubic feet per hour of inert gas through rotameter 6 and conduit 7 is ample to exclude catalyst from conduit 7. The optimum rate of flow of bleed gas will vary with different applications, however, and should be determined experimentally for the particular conditions under which the instrumentation assembly is to be employed. In the same manner, a constant flow of 2 cubic feet per hour of inert gas is passed through conduit 11 against the pressure contained in the lower portion of reactor vessel 1, the inert gas passing through rotameter 6b and conduit 12, the rate of flow being adjusted by means of valve 5b.

Since, as is well known, the viscosity of a gas is independent of pressure except for very high or very low pressures, it will be seen that as long as equal and constant flow of inert gas is maintained through conduits 7 and 11, the pressure differential between conduits 7 and 11 will be the same as that existing between the bottom of stand-pipe 2 and the lower portion of reactor vessel 1 over all normally encountered operating pressures.

Following the same procedure, a constant flow of 2 cubic feet per hour of inert gas is passed through conduits 22 and 16 against the respective pressures of those parts of reactor vessel 1 with which they are in flow communication. In this manner differential pressure readings are obtained with manometers 9a and 9b which are, for all practical purposes, identical with the pressure differentials existing over the various parts of reactor vessel 1 with which the manometers are connected.

The accuracy of the readings obtained by the various instruments is, of course, also dependent upon the resistance to fluid flow in conduits 7, 11, 16 and 22. For this reason it is important to utilize a rubber lip check valve as described above. It has been found that this type of valve offers negligible resistance to flow therethrough at the flow rates employed in the present assembly. Furthermore, even very slight pressure surges within the reactor or stand-pipe are sufficient to collapse the rubber lip and close the valve to reverse flow therethrough, the sealing effect of the valve being in direct proportion to the intensity of the pressure surge. As soon as the pressure surge subsides, the internal pressure of the inert bleed gas opens the rubber lip and the assembly automatically returns to normal operation without any adjustment on the part of the operator.

The negligible resistance to flow provided by a rubber lip check valve is also of great importance when employed with instruments other than differential pressure manometers and the like. For example, in Fig. I, the pressure gauge at 14 will also read at substantially the same pressure as that part of the system with which it is in flow communication since the excess pressure required to pass a small amount of inert gas through conduit 22 and check valve 8c against the internal pressure of vessel 1 will always be a negligible value with respect to the internal pressure. However, as in the instance described above, even though the pressure differential between conduit 22 and the interior of vessel 1 is a minor value, a slight pressure surge in vessel 1 will immediately close check valve 8c and prevent flow of catalyst through conduit 22 towards pressure gauge 14.

It will be apparent to those skilled in the art that the principle illustrated above in relation to a fluid catalyst system may be applied in the instrumentation of any unit requiring instrumentation wherein the material contained within the unit will have a deleterious effect upon instruments if permitted to enter the instrument conduits. Thus, the general instrumentation assembly illustrated above may be utilized, with suitable minor modifications if desired, in connection with any vessel, conduit or the like which contains vaporous materials or pulverulent materials in a vapor or gas suspension, as for example distillation units, gaseous reaction and/or conduiting systems, pneumatic systems for transporting pulverulent materials, acid concentrating and evaporating systems, etc.

I claim as my invention:

1. In an instrumentation assembly comprising a unit adapted to contain fluid and pulverulent material and requiring instrumentation; an instrument: a first conduit leading in flow communication from said unit to said instrument; a second conduit in flow communication with said first conduit at an intermediate point thereof for communication with a source of fluid under pressure greater than that existing in said unit, said first conduit being non-restricted between said unit and said second conduit, whereby said first conduit offers a negligible resistance to the flow of fluid from the second conduit into said unit; and a flexible-lip check valve in said first conduit between said unit and said second conduit for preventing flow of pulverulent material from said unit to said instrument having axially elongated flattened side walls, at least one of which is made of flexible material, thereby providing a check valve offering a negligible resistance to the flow of fluid therethrough.

2. The assembly according to claim 1 wherein the check valve is provided with a smooth housing surrounding the lips and tapering gradually downstream, to prevent lodging of pulverulent materials at the check valve.

3. In an instrumentation assembly comprising a vessel adapted to contain fluid and pulverulent material and requiring instrumentation: a manometer; a first conduit interconnecting said vessel and manometer; a second conduit in flow communication with said first conduit at an intermediate point thereof for communication with a source of inert fluid under pressure greater than that existing in said vessel during operation, said first conduit being non-restricted between said vessel and second conduit, whereby the first conduit offers a negligible resistance to the flow of said inert fluid therethrough into the vessel; a valve and a flow indicating device in said second conduit; and a rubber-lip check valve in said first conduit between said vessel and the second conduit for preventing flow of pulverulent material from said unit to said instrument, said check valve having a pair of flattened, axially elongated rubber lips, thereby providing a check valve offering a negligible resistance to the flow of fluid therethrough.

4. In combination with a unit normally operating under pressure and containing pulverulent material, an instrumentation assembly comprising: differential pressure manometer means; primary conduit means leading in flow communication between each leg of said manometer and said unit; secondary conduit means in flow communication with each of said primary conduit means for communication with a source of fluid under pressure greater than that existing in said unit during operation, said primary conduit means being non-restricted between said unit and said manometer legs, whereby said first primary conduit means offer a negligible resistance to the flow of the fluid from the secondary conduit means into said unit; flow control means in said secondary conduit means; and a flexible-lip check valve in said first primary conduit means between said unit and their respective secondary conduit means for preventing flow of pulverulent material from said unit to said manometer having axially elongated flattened side walls, at least one of which is made of flexible material, thereby providing a check valve offering a negligible resistance to the flow of fluid therethrough.

5. In an instrumentation system comprising a vessel adapted to contain fluid and pulverulent material and requiring instrumentation, an instrument, a first conduit interconnecting the vessel and the instrument, a source of a fluid under pressure in excess of that within the vessel, a second conduit interconnecting said source with the first conduit, and means in the second conduit for regulating the flow of fluid therethrough: the improvement wherein said first conduit is non-restricted at least between said vessel and the second conduit, whereby said first conduit offers a negligible resistance to the flow of fluid from said second conduit into said vessel; and said first conduit has a check valve interposed between the vessel and the second conduit for preventing flow of pulverulent material from the vessel through the first conduit and for permitting continuous flow of fluid therethrough into the vessel substantially without pressure drop, said check valve including a housing forming a part of said first conduit, a transverse wall sealed to the walls of the housing at the upstream end thereof, a port through said wall having its inlet end in communication with the first conduit upstream, and a lip valve of collapsible elastic material within said housing downstream of the wall having its upstream end affixed in a distended position in flow communication with the said port, said valve having an elongated body with flattened side walls spaced from the housing and urged together only by the pressure of fluid acting on the outer sides thereof, whereby the valve will offer a negligible resistance to the flow of fluid therethrough into the vessel and will collapse with slight pressure surges within the vessel.

LAWSON E. BORDER.

REFERENCES CITED

The following references are of record in the file of this patent:

UNITED STATES PATENTS

| Number | Name | Date |
|---|---|---|
| 621,486 | Burdick | Mar. 21, 1899 |
| 996,588 | Kennedy | June 27, 1911 |
| 1,261,262 | Meredith | Apr. 2, 1918 |
| 1,281,974 | Kaeding | Oct. 15, 1918 |
| 1,930,107 | Rang | Oct. 10, 1933 |
| 2,130,981 | Fischer et al. | Sept. 20, 1938 |
| 2,331,208 | Ludi | Oct. 5, 1943 |